Dec. 14, 1954  J. BROIDO  2,696,751
MOTION-PICTURE CAMERAS AND PROJECTOR
Filed June 26, 1950

INVENTOR:
Jacques BROIDO

Attorney

United States Patent Office 2,696,751
Patented Dec. 14, 1954

2,696,751

MOTION-PICTURE CAMERA AND PROJECTOR

Jacques Broïdo, Carouge-Geneva, Switzerland

Application June 26, 1950, Serial No. 170,302

Claims priority, application France February 24, 1950

5 Claims. (Cl. 88—18.4)

The invention relates to an improvement in the drive used in motion picture cameras and projectors, and especially in the intermittent feeding mechanism and in the shutter driving means.

It is known that the usual driving of the claws presents some drawbacks when a lack of uniformity occurs in the spacings of the holes of the film; if the lack of uniformity is fairly small, the claws force their way in the film, causing thereby an unsufficient displacement of the film, which will be repeated at each feeding stroke throughout the entire length of the film, and which can bring a cramming of the film before reaching the lens in the cameras in which the delivering roll film is unwound at a steady speed. Furthermore, the forced engagement of the film by the claws results in a deterioration of the holes. Besides, if the lack of uniformity in the spacings of the holes is large, the claws will enter the film outside of a hole, producing the "stitching" of the film, or a phenomenon known as the "pumping," resulting from the high pressure of the claw on the film which brings a periodical variation of the position of the film in relation with the lens, and thereby a periodical variation of the focussing.

Devices have been already proposed wherein the intermittent film feeding mechanism comprises a reciprocating member positively driven by the mechanism, for instance by means of a cam or a crank, and on which the claw is pivoted and provided with a spring urging it towards the film and compelling it to engage the film only when a film hole is brought in front of the claw, the spring yielding when the claw is applied against a non perforated film surface without deteriorating same. However in these known devices both horizontal engagement (or disengagement) displacement and the vertical pull down (or return) stroke of the claw are obtained by the same reciprocating motion, resulting in that the time necessary for the displacement of the film in each cycle of operation is relatively long due to the fact that the engagement or disengagement displacement of the claw is performed in the vicinity of the maximum amplitude of the reciprocating movement when its speed slowly increases from zero according to a sinusoidal law. Furthermore, due to the complex movement of the claw produced by a cam or a crank, the engagement or disengagement displacement is not purely horizontal and has a vertical component preventing the speed from being strongly increased due to possible deterioration of the film holes. The sinusoidal law of the reciprocating movement of the driving member also results in that the time necessary in each cycle for displacing the shutter is relatively long due to the slow increase of the speed at the beginning of the movement. This loss of time causes the shortening of the time periods available for the exposure or projection of the film during each cycle of the reciprocating motion.

The object of the invention is to provide a mechanism allowing the reciprocating claw to engage and disengage the film at a high speed without damaging the film.

Another object of the invention consists in successively obtaining from the same driving mechanism two separate movements, the first corresponding to the horizontal engagement or disengagement displacement of the claw and the second to its vertical pull down or return stroke.

Due to the independency of both horizontal and vertical displacements thus obtained, a great velocity may be imparted to the first one without damaging the film due to the suppression of the vertical component.

A further object of the invention is to provide in the driving mechanism a controlled slidable coupling simultaneously allowing both horizontal and vertical displacements of the movement of the claw to be separated, and the claw to yield so long as a film hole is not brought in front thereof.

Still another object of the invention consists in using the separated vertical movement to drive vertically reciprocating shutter during the median part of each cycle when the speed of the driving member has reached a high value.

With these objects in view a drive for use in a motion camera and projector according to the invention comprises oscillatable freely pivoted control members, a rotary driving mechanism, a pivotally arranged driving member to which a reciprocating motion is imparted by said driving mechanism, movable linking members provided with a yieldable braking device and pivotally connected with said oscillatable control members, and a lost motion connection provided between the reciprocating driving member and the braked linking member and arranged to cause said linking members to be displaced together with the control members only during the middle part of each stroke of said reciprocating driving member under yielding of the braking device.

According to an embodiment of the invention the drive comprises a claw carrying member freely pivoted on the driving reciprocating member, a movable linking member pivotally connected with the claw carrying member and provided with a yieldable braking device adapted to retard the displacement thereof to cause said claw to pivot on the driving member at the beginning and at the end of each stroke of its reciprocating motion to engage and disengage the film, said driving member being further provided with abutment means to engage said movable linking member and to vertically displace this latter together with the claw under yielding of the braking device during the middle part of each stroke of the reciprocating motion.

The yieldable braking device may comprise friction or spring means adapted to retard the displacement of the movable linking members in both directions of movement.

The result is that if a hole of the film is out of adjustment, the claw can enter said hole only when in front of it and the displacement of the film which results of the action of the claw will be erroneous, for a single picture, this picture being at the utmost exposed twice but the fault will not be carried on the whole film, contrary to what happens with the known devices.

According to a preferred embodiment, the claw bearing element is linked on one side at the end of an oscillating lever driven by an eccentric cam, and on the other side, is linked, by means of a fork for instance, with the end of another lever mounted on a friction pivot.

Another important feature of the invention, which may be used apart or together with the claw controlling device above mentioned, consists in that the flap of the shutter is fixed on an arm pivoted on the camera and linked, by means of a fork for instance, with the end of an oscillating lever driven through a friction coupling by a mechanism synchronous with the claw controlling device, preferably by the oscillating lever which drives said claw controlling device; two stops are provided to limit the stroke of the oscillating lever carrying of the shutter, to stroke stabilize of the shutter during the displacement of the film by the claws.

A further object of the invention is a new embodiment of the centrifugal governor regulating the unwinding speed of the film in the cameras.

As an example, an embodiment of the improvement according to the invention is described hereafter with reference to the accompanying drawing.

Figure 1:
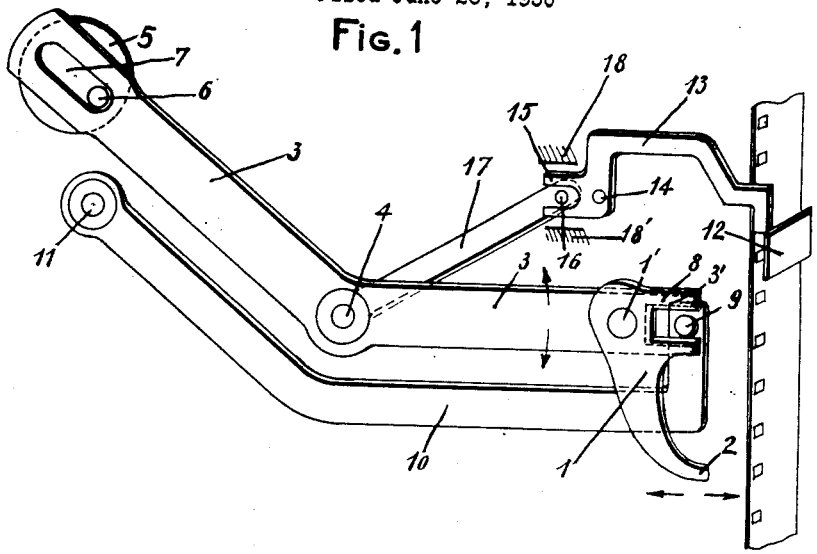
Fig. 1 is an elevation of the claw and shutter controlling device.

As shown in Fig. 1, the member 1 carrying a claw or the claws 2 used for the intermittent drive of the film is pivoted at 1' at the end of an oscillating driving lever 3, which is itself pivoted on the axis 4 mounted on the camera, and driven by a revolving disc 5 rotated by the motor of the camera or of the projector and carrying an eccentric pin 6 sliding in a slot 7 at the end of the lever 3. A rotation of the disc 5 causes a continuous oscillation of the driving lever 3 by means of the pin-and-slot connection 6, 7, whereby the right hand end (as viewed in Fig. 1) of the lever 3 is reciprocated substantially parallel to the direction of feed of the film. Furthermore, the member 1 has a fork 8 engaged with a pin 9 mounted on a second lever 10 frictionally pivoted on the camera at 11, said friction pivot allowing the lever 10 to turn as soon as the claw 2 meets a resistance during its penetration into a hole of the film. The right hand end (as viewed in Fig. 1) of the double-armed lever 3 is in the shape of a fork 3', the arms of which are more widely spaced than the arms of the fork 8 of the member 1, so that the lever 3 can move in relation to the pin 9 through an angle which corresponds to the movement of penetration of the claw 2 into a hole of the film or to its withdrawal. The arrangement of the pin 9 on the lever 10 in such a way that it may engage with play the arms of the fork 3' at the end of the lever 3 forms a lost motion connection between the continuously reciprocating driving lever 3 and the frictionally retarded lever 10.

The mechanism operates as follows: when the lever 3 is rotated around the axis 4 by the eccentric 5—6, at the beginning of a stroke of the forked arm of the lever 3, the member 2 oscillates on the lever 3 around 1', the fork 8 bearing on the pin 9 of the lever 10, the rotation of which is prevented by the friction pivot 11 acting as a brake. As a result of the rotary motion of the member 1, the claw 2 is pushed forwards or backwards, depending on a lowering or lifting of the forked arm of the lever 3, within the play of the pin 9 in the fork 3' of the lever 3. If during its forward movement the claw 2 is exactly in front of a hole of the film, the claw penetrates into the hole, the fork 3' of the lever 3 rests on the pin 9 of the lever 10 and, as soon as the play between the fork 3' and pin 9 of the lost motion connection has been overcome and the fork 3' abuts against the pin 9, the entire mechanism including the forked arm of the lever 3, the second lever 10 and the claw member 1, 2 is displaced downwardly, producing the requested driving of the film. If, on the contrary, the claw 2 is not exactly opposite a hole, the resistance to the penetration of the claw 2' into a hole of the film is transmitted, through the hinge-like connection 8—9 to the lever 10, resulting in the rotation of said lever around the friction pivot 11, until the claw 2 meets a hole, and enters it without any resistance. Thus any danger of tearing the holes or of stitching or scratching the film with the point of the claw is avoided. It is possible that, due to the delay necessary for the entry of the claw in the hole, the film is displaced of a quantity smaller than the height of a picture, but this defect will not arise in the following cycle of operation, and a picture, at the utmost, will be partially exposed twice in the vicinity of the upper edge.

When the lever 3, after reaching the lower end of its stroke starts to reascend, the member 1, pivoting around 1' on the lever 3 disengages the film, the fork 3' of the lever 3 abuts on the pin 9 and all the mechanism moves upwards to resume the initial position.

The above described claw controlling device offers in addition the following advantages:

(1) First, in account of the double linkage of the member 1 bearing the claw 2, and if the engaging of the film by the claw takes place when said claw is close to the maximum amplitude of its oscillating motion, the engaging of the hole shall be substantially rectilinear, this being of great importance as all damages to the hole are thereby avoided.

(2) With a suitable selection of the ratio between the lever arms 1'—4 and 1'—9, the engaging and disengaging motion of the claw can reach a very high speed, precisely because the friction drive prevents all accidents, should the holes of the film get out of the adjustment. This speed of the claws results in an increase of the time available for exposure of the film.

(3) The "pumping" phenomenon exists no longer since any strain of the claw on the film results in a sliding of the friction drive.

(4) As the claw controlling device has a thickness of a few millimeters it becomes possible to build cameras having a very flat shape.

The apparatus, according to the invention includes a shutter, the flap of which has a reciprocating movement. The flap is fixed on a member 13 pivoted in 14 on the camera and linked through the fork 15 and the pin 16 on the end of an oscillating lever 17, which is pivoted in 4 and motioned by the friction drive either by the claws control lever 3, or by an oscillating member directly driven by the camera motor. Two stops 18, 18' limit the oscillations of the member 13 bearing the shutter, or of the lever 17; thus this displacement of the shutter is limited before the lever 3 reaches the end of its run and thereby, for each functioning stage of the mechanism, the shutter 12 is fixed in position in front of the lens, in shutting off position, during the engaging and disengaging motion of the claws 2. If the length of the lever arm 16—14 is small enough in relation to the lever arm 16—4, the amplification of the speed is sufficient to ensure the opening and closing of the shutter in a very small fraction of the time of the complete stroke of the main control lever 3. An other result is that the duration of the shutters movement is very small and increases notably the time of exposure of the film, when compared with the known shutter types.

Figure 2:
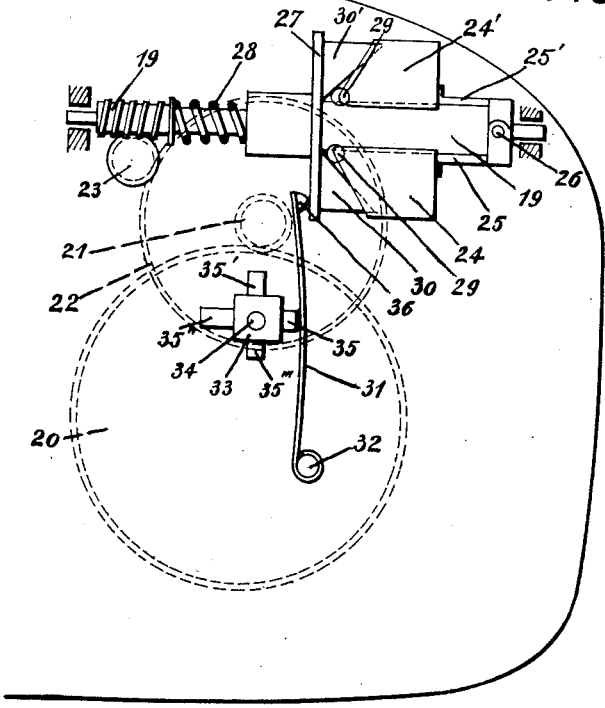
Fig. 2 shows an elevation of the speed governor.

According to the invention the cameras are provided with a regulating device for the unwinding of the film (Fig. 2) consisting in a centrifugal governor mounted in a known way on a shaft 19 driven by the spring motor 20 of the camera through a reducing gear train 21, 22, 23. The centrifugal governor consists in two semi cylindrical fly balls 24, 24' pivoted in 26 through arms 25, 25' on the shaft 19 and of a disc 27 revolving on the shaft 19 and worked by a spring 28. To their ends opposite to the link 26, the fly balls bear elements such as stems or runners 29, 29', resting on slopes 30, 30' integral with the disc 27. When the shaft 19 rotates, the balls 24, 24' move apart from the shaft through the centrifugal force and thust back the disc 27 through the axes 29, 29' on the slopes 30, 30'. The speed can be regulated in limiting the axial displacement of the disc 27 by means of a rigid stem 31 pivoted in 32 on the camera and bearing at one end on the disc through a friction pin 36. A member 33 is provided to mark the position in which the disc is stopped by the stem 31, and thereby the speed: the member 33 can turn around the axis 34 and bears several pins having different lengths; for instance four pins, 35, 35', 35'', 35''', if four speeds are required, and each pin can be brought in abutment with the stem 31, thus acting as an adjustable stop.

What I claim is:

1. A drive for use in a motion picture camera and projector having oscillatable film feeding claws, said drive comprising a rotary driving mechanism, a pivotally arranged driving lever provided with a fork shaped end, means whereby a reciprocatory motion is imparted to said lever by said mechnism, a claw carrying member hinged on said driving lever and also provided with a fork, the spacing of the tines of the fork of the driving lever being greater than the spacing of the tines of the fork of the claw carrying member, a second pivotally arranged lever provided on one end with a friction pivot and on its other end with a pin engaging both forks provided on the driving lever and on the claw carrying member, the play with which said pin engages the fork shaped end of the driving lever allowing said member to be swung around said pin at the beginning and at the end of each stroke of the reciprocatory motion of the driving lever to engage and disengage the film holes by the claws, and the friction preventing the free oscillation of the second lever being determined to allow said frictional pivot to rotate and the claw carrying member to be displaced vertically in the medium part of each stroke of the driving lever, as soon as one of the tines of the fork shaped end of the driving lever contacts the pin of said second lever.

2. A drive for use in a motion picture camera and projector having a reciprocating shutter, said drive comprising a rotary driving mechanism, and a pivotally arranged arm carrying said shutter and having a fork shaped end, a pivotally arranged driving lever, means whereby a reciprocatory motion is imparted to said lever by said rotary mechanism, a second lever frictionally pivoted on said driving lever and provided at its end with a pin engaging the fork shaped end of the shutter carrying arm and two control stops for limiting the amplitude of oscillation of the shutter carrying arm, whereby a sliding of the said friction coupling occurs at the beginning and at the end of each stroke of the oscillating motion of the shutter.

3. A drive for use in a motion picture camera and projector having oscillatable film feeding claws and an oscillatable leaf shutter driven by the same rotary driving mechanism, said drive comprising a pivotally arranged driving lever provided with a fork shaped end, means whereby a reciprocatory motion is imparted to said lever by said mechanism, a claw carrying member hinged on said driving lever and also provided with a fork, the spacing of the tines of the fork of the driving lever being greater than the spacing of the tines of the fork of the claw carrying member, a second pivotally arranged lever provided on one end with a friction pivot and on its other end with a pin engaging both forks provided on the driving lever and on the claw carrying member, the play with which said pin engages the fork shaped end of the driving lever allowing said member to be swung around said pin at the beginning and at the end of each stroke of the reciprocatory motion of the driving lever to engage and disengage the film holes by the claws, and the friction preventing the free oscillation of the second lever being determined to allow said frictional pivot to rotate and the claw carrying member to be displaced vertically in the medium part of each stroke of the driving lever, as soon as one of the tines of the fork shaped end of the driving lever contacts the pin of said second lever, a pivotally arranged arm carrying the shutter and provided with a forkshaped end, a connecting lever frictionally pivoted at its one end on the reciprocating driving lever and provided at its other end with a pin engaging said fork shaped end of the shutter carrying arm, two stops for limiting the amplitude of oscillation of said arm and for immobilizing the shutter during the part of the stroke of the driving lever corresponding to the driving of the film caused by the vertical displacements of the claw carrying member.

4. A drive for use in a motion picture camera and projector comprising a rotary driving mechanism, a pivotally arranged driving member, means to impart to said driving member a continuous reciprocatory motion by the rotary mechanism in a direction substantially parallel to the direction of feed of the film, a film feeding claw member freely pivoted on said continuously reciprocating driving member, a movably mounted second member, a yieldable braking device engaged with said second member, said braking device being capable of retarding a motion of said second member, means for hingedly connecting said second member with the film feeding claw member, and a lost motion connection provided between the continuously reciprocating driving member and the retarded second member, whereby the claw member is allowed to pivot on the reciprocating member near the beginning of the up and down strokes of said reciprocating member due to the said lost motion connection so as to cause engagement and disengagement of the claw member with the film, whereas during the remainder of the strokes of said reciprocating member the claw member participates in the reciprocating movements of the reciprocating member due to the yielding of the braking device so as to provide feed movement of the film in one direction and to return into its starting position in the other direction.

5. A drive for use in a motion picture camera and projector comprising a rotary driving mechanism, a pivotally arranged driving lever, means to impart a continuous reciprocating movement to said driving lever by said rotary mechanism in a direction substantially parallel to the direction of feed of the film, a film feeding claw member freely pivoted on one end of said reciprocating driving lever, a second lever mounted on its one end on a fixed friction pivot and hingedly connected at its other end with the claw member, cooperating abutting surfaces arranged with play on said driving lever and said second lever to provide a lost motion connection between said levers, whereby the claw member is allowed to pivot on the reciprocating lever near the beginning of the up and down strokes of said reciprocating driving lever due to the said lost motion connection so as to cause engagement and disengagement of the claw member with the film, whereas during the remainder of the strokes of said reciprocating lever the claw member participates in the reciprocating movements of the reciprocating lever due to the sliding of the second lever on the friction pivot so as to provide feed movement of the film in one direction and to return into its starting position in the other direction.

References Cited in the file of this patent

UNITED STATES PATENTS

| Number | Name | Date |
| --- | --- | --- |
| 939,274 | Lagergren | Nov. 9, 1909 |
| 963,740 | Bingham | July 12, 1910 |
| 1,129,327 | Bingham | Feb. 23, 1915 |
| 1,410,029 | Niell | Mar. 21, 1922 |
| 1,892,412 | Steiner | Dec. 27, 1932 |
| 1,940,232 | Spence | Dec. 19, 1933 |
| 1,951,762 | McClay | Mar. 20, 1934 |
| 2,336,245 | Harmon | Dec. 7, 1943 |
| 2,451,452 | Thunberg | Oct. 12, 1948 |
| 2,533,560 | Coffey | Dec. 12, 1950 |